Nov. 29, 1938.   H. E. IRWIN   2,138,034
PROPELLING MECHANISM FOR AIRCRAFT AND VEHICLES
Filed May 23, 1934   2 Sheets-Sheet 1
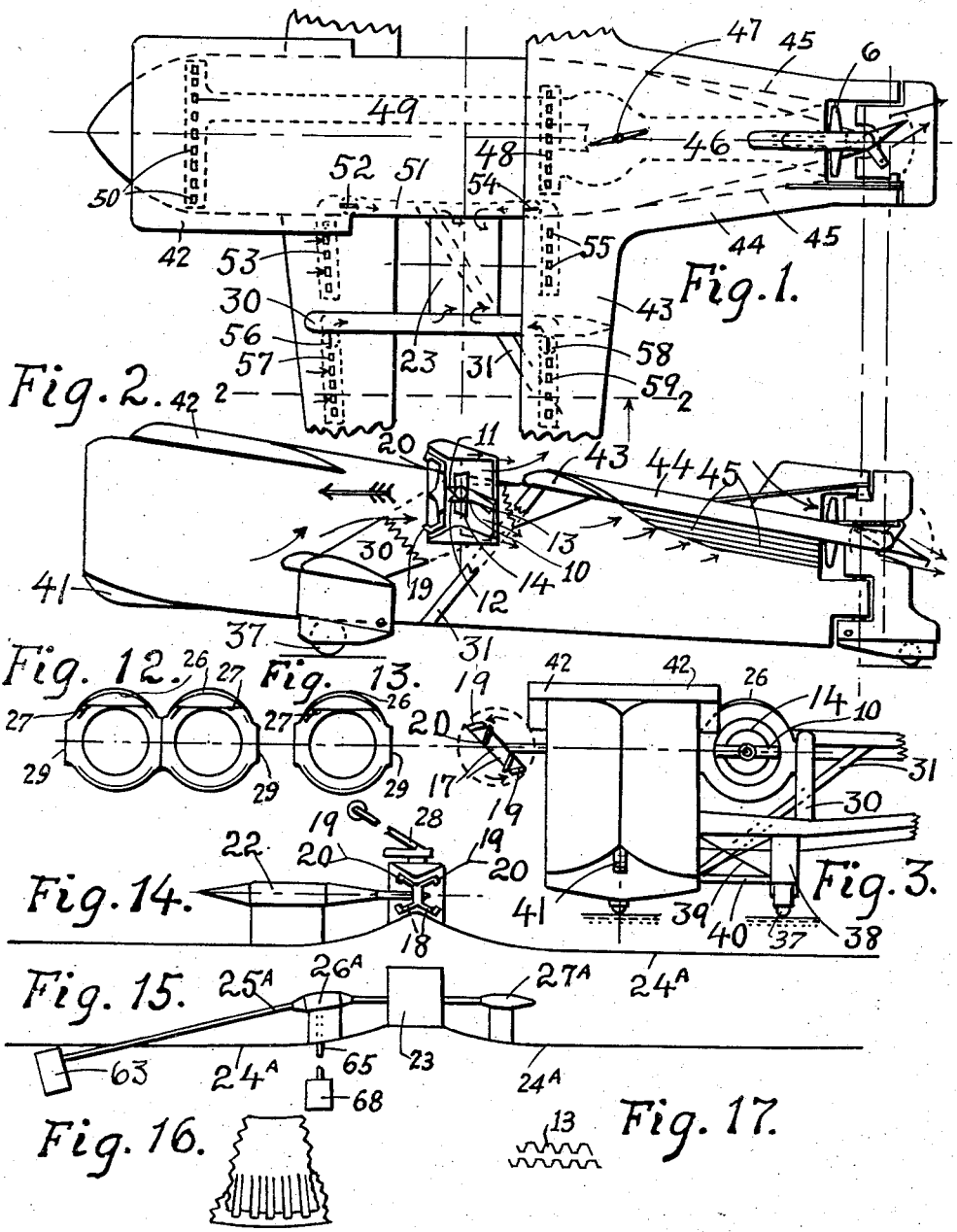
WITNESS
Ellwood R. Irwin.
INVENTOR
Herbert E. Irwin Nov. 29, 1938.   H. E. IRWIN   2,138,034
PROPELLING MECHANISM FOR AIRCRAFT AND VEHICLES
Filed May 23, 1934   2 Sheets-Sheet 2
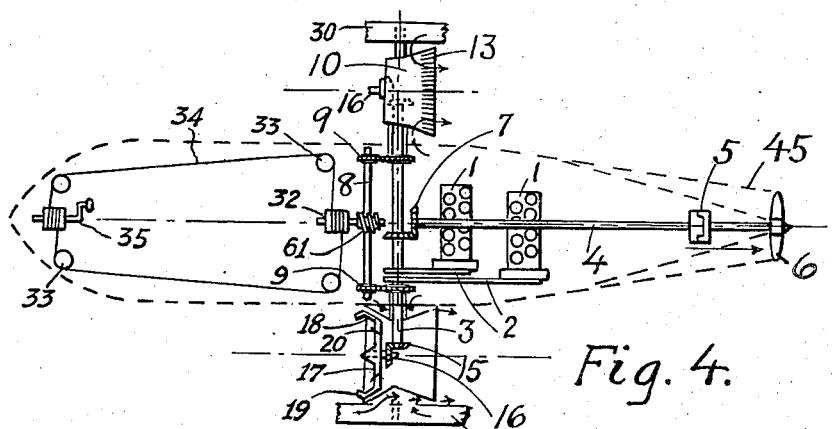
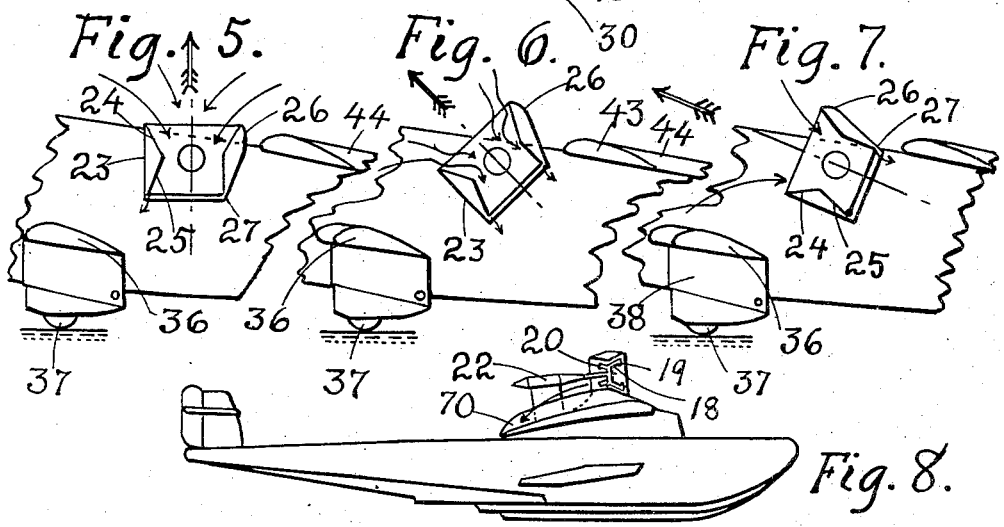
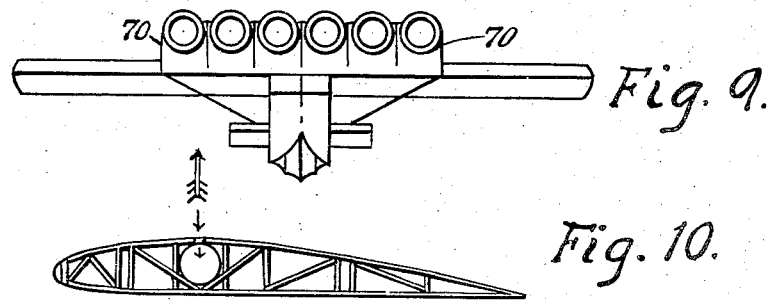
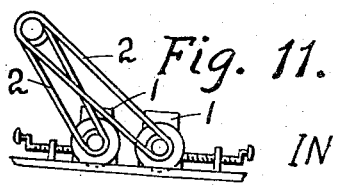
WITNESS
Ellwood R. Irwin.
INVENTOR
Herbert E. Irwin Patented Nov. 29, 1938

2,138,034

UNITED STATES PATENT OFFICE 2,138,034

PROPELLING MECHANISM FOR AIRCRAFT AND VEHICLES

Herbert Ellwood Irwin, Barons, Alberta, Canada

Application May 23, 1934, Serial No. 727,126

20 Claims. (Cl. 244—4)

In giving my invention its title, Propelling mechanism for aircraft and vehicles, I include all types of airplanes that possess a wing or wings, flying boats and helicopters that are intended to make vertical flight with or without wings and a drive for vehicles, sleds and dirigibles.

My designed aircraft may be considered a hybrid between the airplane and helicopter.

My present invention relates to the movement of air by rotating propeller blades against, away from, into and around surfaces thereby effecting useful thrust.

This invention is an improvement on my airplane Patent Number 1,883,740 dated Oct. 18, 1932, which made use of side tiltable propellers, thereby using the thrust from the propeller blades in any desired direction.

This invention is also an improvement or a supplement to an application for United States patent having a subject "Aircraft" Ser. Number 727,125, which dealt with different types of controls, as there is a need to have my type of aircraft under control regardless whether near zero or any rapid forward speed.

One of the objects is to obtain a greater upward thrust than the total aircraft weight plus its pay load, without using wing lift as obtained in forward flight. This object I accomplish by three different thrusts, one by an airdrainage system, one by outside hollow cowl rings and one by propeller blades.

The outside hollow cowl rings and side propellers are tiltably controlled to give any desired directional thrust.

My object is to utilize the side slip-stream as a suction fan and a rear pusher propeller as a suction fan for my airdrainage system, thereby lowering the air pressure over the fuselage and wing tops for upward thrust without requiring additional power to operate the aircraft.

Another object is to have the total area of the inlets smaller than the cross sectional area of the air passageway in order to reduce the air pressure below the inlets for vertical lift or thrust.

Also another object in placing my outside hollow cowl rings in a position to surround the propeller blades is to give protection to the propeller blades from a side wind at a time when the thrust is upward, thus to make my aircraft airworthy in a wind.

A further object is to place the motors on the floor frame, to lower the center of gravity of the aircraft and place the outside hollow cowl rings and propeller blades at a high position well above the center of gravity, thereby tending to keep the aircraft in a proper balanced position.

Another object of my invention is to make use of two or more sets of outside hollow cowl rings and their propeller blades at each side of the aircraft fuselage.

Another object is to place a small wing in the slip-stream back of the side propeller blades inclosing the shaft that drives the propeller blades, thereby giving considerable lift (thrust) as a wing would in a strong artificial wind regardless of forward speed of the aircraft.

Another object is to have right and left slip-streams swirl in opposite directions from each other back alongside the fuselage rear part in a spreading out manner while in forward flight, thereby obtaining two advantages, one to overcome drag to the fuselage rear part by directing air inwardly thus tending to squeeze the fuselage forward, the other advantage being to give an upper thrust by the upward swirling slip-stream going against the under side of top wing and underside of the tail wing that overhangs the rear part of the fuselage.

Another object is to obtain an upward thrust in front of the center of gravity to balance the upper thrust just mentioned that comes up under the tail wing back of the center of gravity by increasing the degree of vacuum over the lower front wing in front of the side propellers and outside hollow cowl rings by sucking the air off that part of the wings by the propeller blades.

An upward thrust of the fuselage is accomplished by the pusher propeller sucking air from the top of the fuselage only, at a time when the slip-stream goes backward and the thrust is forward by the blades.

An object of my invention is to make use of my outside hollow cowl ring in combination with an improved type of propeller blades to be applied to sleds, flying boats, vehicles, railcars, blimps and dirigibles in order to obtain greater thrust than by propeller blades alone.

Other objects will appear hereinafter.

Figure 1 is a plan view with the right wings broken off close to the fuselage and the left wings broken off at their outer ends.

Figure 2 is a side elevational view as taken at the broken line 2—2 on Figure 1 with the gap brace member between the wings broken away and the outer hollow cowl ring and sleeve member in section.

Figure 3 is a front view of a fragment of the airplane with its propeller blades at one side and outside cowl ring with sleeve member assembled at the other side of the fuselage less the propeller blades.

Figure 4 is a plan view of the power plant and drive shafts and mechanism used to swivel the sleeve member and outside hollow cowl ring.

Figures 5, 6 and 7 are side views of a fragment of a fuselage with empty outside hollow cowl rings in section, each ring being in a different tilted position and the direction of thrust being represented by the large arrow.

The cowl ring could be turned to direct a thrust backwards.

Figure 8 is a side view of a flying boat of the Dornier type (DO–X) with one of the upper outside cowl rings in section. Figure 9 is a front view of the same boat with six empty outside cowl rings, the propellers being removed.

Figure 10 is a view of an airplane rib of the Clark Y type as made of wood with a tubular air passage in section inserted within the rib. Figure 11 is a side view of two motors located on the floor frame, each having means to move the motors to properly tighten the drive chains or belts.

Figure 12 is a back view of two outside cowl rings as secured together to accommodate two side propellers.

More than two outside cowl rings with their propellers could be used on each side of a fuselage. Figure 13 is a back view of a single outside cowl ring.

Figure 14 is a side view of the roof line of a railcar or bus and a section of an outside cowl ring. The propeller in this figure is driven by an electric motor located some distance from the cowl ring and supported on a single leg member.

Figure 15 is a view similar to that of Figure 14, the cowl ring not in section. The motor in this figure is located below the roof.

Figure 16 is an outline drawing of a back view of a fragment of the outside cowl ring, having a corrugated surface to aid air suction at the air outlets.

Figure 17 is a drawing of a corrugated air outlet for the propeller wing or the sleeve member. A section view is shown in Figure 2 of the propeller wing.

Referring now to said drawings by reference numerals, 1 indicates multiple cylinder motors with fly-wheel and clutch, 2 chains or belts, 3 a cross drive shaft, 4 a longitudinal drive shaft with clutch at 5, 6 rear pusher propeller, 7 a set of bevel gears to drive the longitudinal drive shaft from the cross drive shaft, 8 a countershaft with spur gears at each end as 9. The gears 9 and 9 engage gears on the inner ends of wing sleeve members. Chains and sprockets may take the place of the spur gears.

As shown on the upper side in Figure 4, 10 indicates a small propeller wing placed back of the side propellers (when assembled) and this wing will be in the slip-stream when the propeller blades are in rotation, thus a useful upward lift (thrust) will take place regardless of forward speed of the ship.

Propeller wings 10 act as supporting sleeve members for the cross drive shaft and are made to carry the load from the rotating side propeller blades.

Propeller wings 10 in turning the air flow down will tend to offset the torque of the propellers.

If it were not for the propeller wings 10 in the slip-streams a serious drag or parasitic loss would be in effect, therefore the overcoming of a loss in drag is the equivalent result to a gain in thrust.

As shown in Figure 2 the propeller wing 10, front edge 11, is tilted up on one side of the propeller hub and the edge 12 is tilted down on the other side.

The object of having the front edges of the propeller wing 10 shaped in this up and down manner is to reduce the drag or resistance to the air flow from the revolving propeller blades, as the air moves back in a swirl and tends to strike up on one side and to strike down on the other side.

Corrugations, or up and down surfaces, are indicated by 13 and their advantages will be mentioned later on.

Air deflecting ring 14 is shown in Figures 2 and 3 and is secured to the propeller wing 10 and its function is to direct the slip-stream outwards against the reverse funnel shaped surface at the rear part of the cowl ring.

Bevel gears 15 are secured to the cross drive shaft 3 which drives the bevel gear on propeller stems 16.

Propeller main arms or blades 17 have diagonal forward and outward air scoops 18 with air deflecting surfaces at 19, preferably placed at their ends shown in Figures 2, 3, 4, 8 and 14.

The function of parts 18 and 19 is to move air inwards and backwards from the inside of the forward part of the cowl ring.

In Figure 14, 19 and 20 would appear to be one and the same type of air scoop, it is a type that may rotate clockwise and anti-clockwise for forward and backward movement of the vehicle.

This reversing of the propeller blades at a time when the car is moving will act as a brake to bring the car to a quick stop.

In Figures 2, 3 and 4 the part 20 is more like a blade or fin attached to arm 17 of the propeller blades. Air scoops or air deflecting surfaces are indicated by 20 and may be placed on either front or back side of the blades and their function is to direct the slip-stream backwards and outwards against the reverse funnel shaped surface at the back part of the cowl ring.

Electric motors indicated by 22 in Figures 8 and 14 drive the propellers by direct drive shafts.

Motor 63 located below the roof line 24A drives the propellers by shaft 25A or motor 68 with vertical shaft 65 drives the propellers.

Within part 26A is a universal joint or bevel gears as the case may be; bearing 27A supports one end of the propeller shaft as shown in Figure 15. An outside hollow cowl ring is shown in a top view in Figure 1; in section views in Figures 2, 4, 5, 6, 7, 8 and 14; in a front view in Figures 3 and 9; in a rear view in Figures 12 and 13; and in a side view in Figure 15.

The outside shell part of the outside hollow cowl ring is indicated by 23; the inner forward surface spoken of as funnel shaped surface by 24; the inner backward surface spoken of as reverse funnel shaped surface by 25.

The upper outside shell part of the hollow cowl ring has a front hump part at 26 and back from this hump to the trailing back edge is surface 27, this shape is quite like a wing top to give lift when in flight.

The under surface, the surface just below surface 27, is also like the underside surface of a wing. It should be noted that the flow of air from the propeller blades in moving back in a spreading out manner would tend to strike extra hard against the surface below 27 and thus tend to rotate the cowl ring helping propeller wing 10 to offset the torque mentioned before.

The cowl rings to drive vehicles do not need surfaces 26 and 27 and may be of uniform shape as shown in Figure 15. In Figure 14 a trolley pole is shown by 28. The flattened parts of the cowl rings are shown by 29 where they fit against the fuselage sides and air sleeve member 30 as shown in Figures 1, 3, 12 and 13.

The air sleeve member 30 incloses the wing gap strut braces and forms an air passage between the outside cowl ring and wings.

A diagonal strut brace member 31 secures the upper wing to the fuselage and also supports the air sleeve member 30. The lower end of the brace 31 is well to the front to be out of the slip-stream, as it should be. As shown the strut brace 31 may be only in the slip-stream when the side propellers and cowl ring are turned to a position as shown in Figure 5, however this position may very seldom be used.

The outside hollow cowl rings may be made in parts and assembled by clamping them together. The several sectional views of the hollow cowl rings show air-outlets at their trailing back edges and show an air tight front edge.

The means I use to turn or swivel the side cowl rings and propeller blades is shown in Figure 4. 61 indicates a worm gear which works in conjunction with the countershaft 8.

Drum 32, located on the same shaft as the worm gear 61, is turned by the crank at drum 35 through cable 34 held in place by grooved pulleys 33 and 33.

The lower-front wing is indicated by 36, front wheel by 37, wheel pant by 38, cross brace strut by 40, diagonal brace wires by 39. The brace 40 and diagonal wires 39 give stiffness to the front wheels, lower-front wing 36 and support to the cowl ring through the gap wing brace members housed within the air sleeve member 30.

On the lower front end of the fuselage I place a runner 41 which will tend to prevent a nose over. On the upper front end of the fuselage is a small wing or overhanging part 42.

An upper-back wing is secured to the fuselage flush with its top and is indicated by 43.

A wing spoken of as a tail wing indicated by 44 forms the roof of the back end of the fuselage and joins the wing 43 as a continuation at its central part and has overhanging sides; that is, it is wider than the fuselage and its back end is next to the pusher propeller 6.

The object of the outward bulged surface 45, shown in Figure 2 by parallel lines, is to prevent the air from entering the pusher propeller from a region around the outside of the fuselage sides.

The air sucked in by the pusher propeller from a region only above the tail wing and from the fuselage top through air passage 46 reduces the air pressure below normal, thereby giving buoyancy (upward thrust) to the fuselage.

The rear air passage 46 with its outlet at the pusher propeller 6 continues forward to a two way air valve 47. From the two way air valve 47 the air passage divides, one side connected to air inlets in the roof at 48 while the other side continues on forward in 49 to the front air inlet at 50 in the roof.

The slip-streams from my side propeller blades move back in a spreading out manner against the trailing edges of the outside hollow cowl rings and act as a suction fan and suck air out at the trailing air outlets. These air outlets are shown in Figures 2, 4, 5, 6 and 7. Propeller wings 10 located in the same side slip-streams have air outlets at their trailing edges. The hollow interior of propeller wings 10 connect up to the hollow interior of the hollow cowl rings.

Many a slip-stream from propellers of the present day designed airplanes act as a detriment in that they tend to blow the fuselage, brace wires, struts and exposed parts backwards.

The slip-streams from my aircraft are an asset recovering as it were energy or power from the flowing air stream by drawing air through air passages from air inlets in the wing tops, thereby lowering the air density above for upper lift (thrust), effecting beneficial results at zero or any forward speed.

My air drainage system is shown in Figure 1, the arrow indicates the flow of air into the air intakes in the lower wing top at openings 53, then around through valve 52, then on through air passage 51 within the fuselage, then on into the hollow cowl ring; again starting at the openings 57 the air flows through the valve 56, then into the air sleeve member 30, then into the hollow cowl ring; again starting at the openings in the upper wing top at 55 the air flows through valve 54, then through air passageway 51 into the hollow cowl ring; again starting at the openings in the upper wing top at 59 the air flows through valve 58, then into air sleeve member 30 on into the hollow cowl ring.

The air valves 52 and 54 may be placed where it is most convenient in the wings or in the fuselage air passage at 51, and valves 56 and 58 may be placed in the wing or in the air sleeve member 30.

As longitudinal and lateral control is not a part of this invention, the merits of valves 47, 52, 54, 57 and 58 will be omitted.

The merits of my pusher propeller for directional and longitudinal control will be left out as it belongs to my application for a patent on an aircraft, Ser. No. 727,125.

In Fig. 8 the motors are of the long and slim type and are placed some distance back of the propellers to avoid air drag as much as possible. The propellers are rotated by direct drive shaft from the electric motors. The outside hollow cowl rings are placed joining each other and secured rigidly to the wing top. Some critics would point out that this arrangement would make for excessive weight.

I wish to point out that far greater lift is obtained by my design than the original "DO-X" type with front and pusher propellers in front of and back of large motors.

The reason for the great lift attained by my design is due to the large area of low air pressure on the wing top back of the cowl rings, where the several slip-streams spread out and join together and come down on the trailing back edge of the wing as shown by the arrow in Figure 8.

It is possible that the cowl rings should be placed closer together than those shown in the drawings in order to leave no air holes between the slip-streams, to let air down between them.

The movement of the slip-streams back and down over the wing top draws the air that is located above the wing top and under this rapid moving air blanket by a suction pull back over the wing. It is pointed out that no air from in front of the cowl rings and below them and above the wing can pass back between or under the cowl rings, as a rigid airproof surface is placed between the cowl rings and the wing top. Therefore as no air will be able to move down through the moving blanket of air back of the cowl rings, the only entrance would be from the outside ends.

This side entrance has been cut off by end vertical fins as marked by 70 in Figures 8 and 9. An experiment should be tried out by tying up this boat by the tail and operating all the motors and observing the lift the boat will make from the water without forward flight.

This vertical lift (thrust) of the boat wing is possible at any forward speed and is very valuable in getting the boat off the water at starting time.

Referring now to wing construction; airplane wings are of two types, one type is of wood ribs and fabric construction and the other type of metal.

The interior of a metal wing may be used as an air passage, but I do not recommend this, that is, for my air drainage system, due to the difficulty of making all the seams and other parts of the wing airtight. Then again there may be a tendency to collapse or change the shape of the thin metal surface. I recommend that true circular tubing be used wherever possible for my air passages.

To those persons, undertaking to build my designed aircraft and vehicles, I wish to point out that the larger the volume of air going through the air drainage system the better. The boundary layer, that is, the outside surface of a slipstream, has an influence (suction) to carry along with it the air contacting it.

By using a uniform width of slot in the air outlets, only a given boundary of the slip-stream surface can be utilized. By the breaking up of the boundary layer into hills and valleys, as it were, the boundary layer will be increased, thus an increased suction or pull takes place. That is why I use the corrugated air outlets to increase the volume of air through my air drainage system.

Now I wish to mention about the advisability of having smaller air inlets than the cross sectional area of the air passages. Normal air pressure (14.7 lbs. per sq. in. at sea level) exerts a push against the exposed parts of all bodies. As this air exerts an equal pressure on all sides of a body, no influence to move the body takes place at a time when the surrounding air is quiet or still. But just as soon as the air is removed from one side of a body the normal air pressure on the other side of the body exerts a push (thrust) effect against that body.

Now my air inlets remove the normal air pressure from one side of a body (wing top) and the sky (normal) air pressure no longer exerts a balanced pressure on that body and a push (thrust) is in effect. There is however a surface in the air passage below the air inlets that is equal in area to the air opening in the body surface (wing top). That being the case it is this inside lower surface below the air opening in the body (wing top) that is important and the air pressure exerted thereon. Therefore the resistance to the flow of air by small air inlets and the less resistance to the flow of air in the air passages will tend to lower the air pressure both in the air passage and on that particular area below the air inlets.

To put it in a nutshell, it is the area and air pressure that gives thrust in the following three ways; first, because of the area of propeller blades and the difference of air pressure thereon on the front and the back sides; secondly, because of the frontal and backward area of the cowl rings and the difference in air pressure thereon; and thirdly, because of the area above a body (as wing top) within the air passage just below the air inlets and below the body (as under a wing) and the difference in air pressure on those areas.

Now I wish to point out to those skilled in the art and desiring to use this invention for vehicle construction and for propelling power; that all three thrusts, just mentioned, can be used to an advantage on vehicles and rail cars. The weight of a vehicle must be lifted against gravity, when climbing a hill. The use of my air drainage system in a car roof would be equal to reducing the car weight (pull of gravity) and would also reduce the rolling resistance and therefore less forward thrust would be required, a saving in fuel and tire wear.

The word motor used in the specification and claims would include any type of power plant or engine.

I have shown by my drawings a preferred application of my outside hollow cowl ring and air drainage system. I wish to point out that changes may be made, such as, securing my outside hollow cowl ring and air drainage system to airplanes and flying boats of the present passenger transport type known as Boeing 247, Douglas and Pan-American Clippers. These airplanes use radial air cooled engines secured to and in front of their wings. In applying my design to this type, very little change need be made other than adding my outside hollow cowl rings and securing them to the wings' front edge in proper relation to the engine and propeller blades, and also changing the propeller blades to my type which is recommended. My outside hollow cowl ring should be secured at its trailing edges on the right and left sides only, allowing one half of the slip-stream to pass backward over the wing and the other one half to pass backward under the wing.

The air outlets may be placed further to the front than shown in the drawings. The air inlets may or may not be restricted to that of the wing top over which the slip-stream passes.

To those skilled in the art of building airplane propeller blades, I have the following suggestions:—the material should be metal, the shape between inner end and outer angle may be similar to the conventional blades to function as a fan to throw air backwards effecting a forward thrust, the air scoop 18 between the angle and the end should be made stiff enough to withstand the centrifugal force and not to bend unduly out of shape. The angle of attack of air scoop 18 should be negative with respect to that of the inside surface of the funnel shaped outside cowl ring, to function as a lifting surface to remove the boundary layer of air next to the ring; the air deflectors may be an integral part of scoop 18 by weld or may be made as a separate part held in place by bolts or by rivets; one, two or more air deflectors may be placed on each scoop.

Referring to propeller blades shown in Figures 8 and 14 the rear part or scoop 18 is in reverse angle of attack to that of the front part or scoop and its function is to force air against the ring, likewise the rear air deflectors move air against the outer ring.

To those undertaking to make my designed aircraft using my pusher propeller, I wish to point out that there is a need of obtaining a part of the air entering the propeller from the front of the center of gravity of the aircraft to balance the effect of removing the air from a region above the tail wing back of the center of gravity.

Therefore the air drainage system with its air outlets in front of the pusher propeller functions as a balancing influence to make my aircraft airworthy at varying speeds of the propeller blades, as power on and power off.

To those skilled in the art of airplane design and construction and desiring to work on this invention the following remarks should be helpful.

Many conventional airplanes have their tail elevators and rudder located in the slip-stream from the propellers, but when the motor stops the slip-stream also stops, then the effect of the tail controls becomes less and their usefulness at landing speed is largely lost.

At a time when my aircraft side propellers are tilted to direct the two side slip-streams down, and forward speed is reduced, a need arises for longitudinal and directional control.

This I accomplish by having a small propeller located at the tail driven by a longitudinal drive shaft from the same motor or motors that drive the side propellers; thus a small slip-stream strikes the tail elevators and rudder at zero or any forward speed, and effective control takes place at a time when the motor's throttle is open.

My tail pusher propeller does not need long blades as it is not intended to give the total forward thrust, but only a small part of the total forward thrust.

In my design I use short arms to support the ends of the rudder and elevator close behind the pusher propeller, therefore only a small amount of material and weight is needed in the arms themselves.

The control arms and rods are not in the slip-stream, reducing airdrag to the minimum.

I consider it advisable to locate the cross drive shaft close to the fuselage top and the motors at the floor frame and use between motor and upper shaft, roller chains or other suitable drive. By having the outside hollow cowl rings and propellers placed high above the center of gravity, then at a time when my aircraft is functioning as a helicopter it tends automatically to balance itself.

The motors located on the floor frame act as a ballast, lowering the center of gravity.

The use of rubber mounting to overcome vibration from motors to frame is recommended.

In my former airplane Patent 1,883,740 I made use of two motors in the fuselage, either one of the two motors capable to continue flight alone should something go wrong with one of them, thereby a forced landing need not take place and repairs can be made while in flight as motors are accessible, the same with this design.

On my present design I not only place my motors on the floor frame but I secure them on sliding frame members so that they can be moved forward or backward for two reasons, one being to properly tighten the drive chain or other belt type of drive, the second reason being to change the center of gravity of the aircraft by moving forward or backward the motors in proper relation to chains or belts of different lengths, the changing from one to the other to suit the position of the motors, when the pay load is varied in front of the motors.

At present time a number of airplanes are built with a set of two or more spur gears to drive their propeller blades slower than the rotation of the motors for greater efficiency.

In my aircraft design where gears and in some cases chain and sprockets are used to transmit power, a desired ratio of speed between motor and propeller is easily arranged.

I recommend for cooling system a radiator of skin type be placed in the hollow outside walls of the fuselage, that causes no air resistance.

The twisting influence (torque) given by the rotating propeller blades to the outside hollow cowl rings may be overcome by experimenting with different sizes and shapes, for both the outside hollow cowl rings and the propeller wings in the slip-stream. Thus a proper pattern should be known or found to balance the propeller blade torque.

In normal flight the wing shaped part of the top part of the outside hollow cowl rings gives an upward thrust or lift. The designer should consider using this top cowl ring wing feature on my boat design.

It is important that good air tight turning or swivelling connections be made to prevent air leak between the hollow cowl rings and fuselage sides and between the hollow cowl rings and the stream-lined members 30 regardless of the direction in which the slip-streams are directed. I recommend felt packing material be used to prevent air leaks.

Various changes, proportion and the minor details of construction may be resorted to without departing from the principle or sacrificing any of the advantages of the claimed invention.

Having described my invention, what I claim is:

1. Propulsion mechanism for conveyance having a source of power, comprising air scoops, air propeller blades and cowling, said air scoops attached to said air propeller blades and driven by said source of power, said cowling attached to the conveyance surrounding said air scoops and the said air propeller blades, said cowling consisting of walls positioned with respect to the conveyance body to have leading and trailing portions, the leading wall portion shaped like a funnel of large diameter with its smaller part backwards, the trailing wall portion shaped like a funnel of large diameter with its smaller part forward, each of the smaller parts of the cowling join together in a rigid manner, said air scoops forward ends positioned adjacent to the leading edge of the cowling and their rearward ends positioned adjacent to the smaller part of the cowling, said air scoops possess an angle of attack, to move air when rotated away from the leading inner portion of the cowling while at the same time the air propeller blades move the air volume within the cowling backwards for the purpose set forth.

2. Propulsion mechanism for conveyance having a source of power, comprising air scoops, air propeller blades and cowling, said air scoops attached to the air propeller blades and driven by said source of power, said cowling attached to the conveyance and surrounds said air scoops and air propeller blades, two air scoops secured to each air propeller blade, said cowling consisting of walls positioned with respect to the conveyance body to have leading and trailing portions, the leading wall portion shaped like a funnel of large diameter with its smaller part backwards, the trailing wall portion shaped like a funnel of large diameter with its smaller part forward, each of the smaller parts of the cowling join together in a rigid manner, said air scoops secured at the outer end of each air propeller blade, the junction between the air propeller blades and the air scoops to take a position within and close to the smaller part of the cowling, one of said air scoops to take a position to the front of the air propeller blade and close to the inner surface of the leading portion of the cowling, the other air scoop to take a position to the back of the air propeller blade; when in rotation the forward air scoop functions to move the air away from the leading inner surface of the cowling and at the same time the air propeller blades function to move the air backwards through the cowling while the rear air scoop functions to move the slip-stream in a spreading out manner against the trailing portion of the cowling, for the purpose set forth.

3. Propulsion mechanism for conveyance having a source of power, comprising air scoops, air propeller blades and cowling, said air scoops attached to said air propeller blades and driven by said source of power, said cowling attached to the conveyance surrounding said air scoops and air propeller blades, said cowling consisting of walls positioned with respect to the conveyance body to have leading and trailing portions, the leading wall portion shaped like a funnel of large diameter with its larger part forward, the forward part of the trailing portion of the cowling join the rear part of the leading portion of the cowling in a rigid manner, said air scoops take a position close to the inner surface of the leading portion of the cowling, said air scoops possess enlarged forward ends to direct the air in their path backwards and toward the center of the cowling and away from the cowling while the air propeller blades function to force backwards the air volume within the cowling; when the air propeller blades are rotating thrusts are given by the blades and by the enlarged ends of the air scoops and by the cowling.

4. Propulsion mechanism for conveyance having a source of power, comprising air scoops and air propeller blades driven from said source of power, a cowling attached to the conveyance surrounding said air scoops and air propeller blades, said cowling consisting of walls positioned with respect to the conveyance body to have leading and trailing portions the leading wall portion shaped like a funnel of large diameter with its smaller part backwards where it joins the trailing portion, two air scoops secured to each air propeller blade, one of the air scoops attached to the air propeller blade's outer end to take a position close to the inner surface of the leading portion of the cowling in a forward outspreading manner and its function is to draw off the air next to the cowl surface, the other air scoop is secured between the inner and outer ends of the air propeller blades and its function is to spread out the slip-stream for the air propeller blades.

5. Propulsion mechanism for conveyance having a source of power, comprising air propeller blades driven by said source of power, a device having a top, sides and a lower portion together formed into a complete cowling and attached to the conveyance surrounding said air propeller blades, said complete cowling including inner and outer walls positioned with respect to the conveyance to have leading and trailing portions, the leading portion of the inside wall shaped like a large funnel with its smaller part to the rear, the trailing portion of the inside wall being shaped like a funnel in reverse except the top portion which does not slope upward, the leading and trailing portions of the complete cowling join together in a rigid manner at their central parts, the outside top portion of the cowling is like the top surface of a wing with its trailing portion sloping downward whereby the top portion of the cowling functions as a wing section to give lift.

6. Propulsion mechanism for conveyance having body parts and a source of power, comprising air propeller blades driven by said source of power, an air deflecting member, a cowling attached to the conveyance surrounding said air propeller blades, said cowling consisting of walls positioned with respect to the conveyance to have leading and trailing portions, the leading portion of the walls formed like a large funnel with its smaller part to the rear, the trailing portion of the walls or major part thereof formed like a large funnel in reverse, both the funnel and reverse funnel shaped walls join at their smaller parts in a rigid relation one to the other, said air deflecting member secured rigidly within and at the front end of the trailing portion of the cowling and located back of the air propeller blades; when said air propeller blades are rotated by the source of power air is drawn in by suction at the leading funnel shaped wall by the action of the air propeller blades thereby reducing the air pressure on said leading wall then the slip-stream from the air propeller blades strikes the air deflecting member and is directed in a spreading out manner against the trailing portion of the wall, thus, due to high air pressure against the back trailing portion and low air pressure against the front leading portion of the cowling, a thrust influence by the cowling is in effect.

7. Propulsion mechanism for conveyance having a body and a source of power, comprising a propeller driven from said source of power, a hollow cowling attached to the conveyance surrounding said propeller, said cowling consisting of inner and outer concentric walls positioned with respect to the body to have leading and trailing portions, the leading portions of the walls being joined in airtight relation to each other, the trailing portion provided with an air outlet, said outer wall having an air inlet opening which communicates by means of passages in conveyance parts with ports to the atmosphere at its top surface whereby operation of said propeller causes a rapid movement of air to move backwards within the trailing portion of the cowling and as the moving air passes the air outlet a suction influence is in effect to draw air from above said conveyance parts at the ports passage and opening, and to discharge the same air through said air outlet in the trailing portion of said cowling for the purpose set forth.

8. Propulsion mechanism as defined in claim 7 wherein the cross sectional size of the passages and the area of the air outlets are each greater than the area of the air inlet ports for the purpose set forth.

9. Propulsion mechanism for aircraft having wing and fuselage parts and a source of power, comprising a propeller driven from said source of power, a cowling attached to the aircraft surrounding said propeller, said cowling consisting of inner and outer concentric walls positioned with respect to the fuselage to have leading and trailing portions, the leading portions of the walls being joined in airtight relation, the trailing portions providing an air outlet, said outer wall having an air inlet opening which communicates by means of passages in said wing parts with ports to the atmosphere in the top of the wing whereby operation of said propeller will draw air from above said wing through said ports, passages and openings and discharge the same through said air outlet in the trailing portion of said cowling.

10. Propulsion mechanism for aircraft having a fuselage, a pair of wings on opposite sides of said fuselage, strut means between the pair of wings on each side of the fuselage and spaced from the fuselage and a source of power in the fuselage; comprising a cowled propeller unit secured at each side of said fuselage between said fuselage and strut means, each unit comprising a propeller driven from said source of power and inner and outer concentric cowl walls surrounding said propeller positioned with respect to said fuselage to have leading and trailing portions, the leading portions of the walls being joined in airtight relation with each other, the trailing portions providing an air outlet therebetween, said outer wall having an air inlet opening which communicates by means of passages in said fuselage, strut means and wing with ports to the atmosphere in the top of said wings whereby operation of said propellers will draw air from above said wings through said ports, passages and openings and discharge the same through said air outlets in the trailing portions of said cowlings.

11. Propulsion mechanism as defined in claim 10 wherein said cowled propeller units are rotatably mounted on an axis passing transversely of said fuselage and means to rotatably adjust said units to different angular positions with respect to said fuselage.

12. Propulsion mechanism as defined in claim 10 wherein each of said cowled units includes a member known as propeller wing, said propeller wings positioned back of the propellers in a fixed rigid manner and provided with an air outlet at its trailing edge and an air inlet into the said cowling, whereby operation of said propellers causes a rapid flow of air backwards above and below the said propeller wing thus effecting an air suction at the air outlets.

13. Propulsion mechanism as defined in claim 9 wherein said air outlet is of corrugated pattern in the said trailing portion of the cowl walls to increase the air flow over that of a slotted type air outlet.

14. Propulsion mechanism for conveyance having a body, a source of power, a hollow propeller wing member with corrugated pattern air outlet at trailing edge, air propeller blades, a cowling attached to the conveyance surrounding said air propeller blades, said cowling consisting of walls positioned with respect to the conveyance to have leading and trailing portions, said propeller wing member positioned back of the air propeller blades in a fixed rigid manner to the inside of the said cowling, said hollow propeller wing member having an air inlet opening which communicates by means of passages in conveyance parts with ports to the atmosphere at its top surface, whereby operation of said air propeller blades causes a rapid movement of air to move backwards within the cowling over and under the propeller wing member, and as the rapid moving air passes the corrugated air outlet a suction influence is in effect to draw air from above said conveyance parts at the ports passage and opening and to discharge the same air through said air outlet in the trailing portion of said propeller wing member.

15. Propulsion mechanism as defined in claim 10 wherein each of said cowled units includes a member known as propeller wing, said propeller wings positioned back of the propellers in a fixed rigid manner, the leading edge of each propeller wing is shaped in a manner to be tilted up on one side of the propeller hub and to be tilted down on the other side of the propeller hub for the purpose set forth.

16. Propulsion mechanism as defined in claim 10 wherein the said fuselage possesses right and left tail wings 44, said source of power rotates the right propeller in a clockwise direction likewise the right slip-stream moves backwards from the right propeller under the right tail wing 44 in a clockwise swirl, said source of power rotates the left propeller in a reverse clockwise direction likewise the left slip-stream moves backwards from the left propeller under the left tail wing 44 in a reverse clockwise swirl, the two air swirls being the influence to give an upward thrust to the tail wing 44.

17. Propulsion mechanism for aircraft having wing and body parts, air tight member, air tight fins and electric motors for power, comprising several propeller sets, driven by said electric motors, one motor for each propeller set, each propeller set consisting of air scoops and air propeller blades, several cowlings attached to the wing top surrounding said several propeller sets one for each set, each of said cowlings consisting of walls positioned with respect to the aircraft to have leading and trailing portions, said several sets of the cowling secured on top of the wing with their front ends of each leading portion to line up, said air tight fins positioned one at the right and one at the left of the outside cowlings and attached thereto and extended backwards over the wing top and attached to the wing in an air tight manner, said air tight member joining the cowling one to another at their front parts in such a manner to prevent air from passing back between the cowlings and between the cowlings and wing top, said electric motors positioned above the wing top and to the rear of the cowlings drive the propellers by shafts; when the propeller sets are rotating air in the path of the air tight member and the cowling is drawn through the cowlings by suction and driven backwards by the air propeller blades in a spreading out manner by the air scoops, the several slip-streams join together and form a blanket of fast moving air back over the wing top while the right and left air tight fins prevent air from entering from the outside to go under the air blanket thereby a low air pressure is in effect for lift under the air blanket and on top of the wing.

18. Propulsion mechanism for aircraft having wing and body parts, air tight members, air tight fins, and a source of power, comprising several air propeller blade sets one for each set, each of said cowlings consisting of walls positioned with respect to the aircraft to have leading and trailing portions, said several sets of cowlings placed in a row with their front ends of their leading portion to line up over the wing, said air tight fins positioned one at the right and one at the left of the outside cowling and attached to the outside cowlings in an air tight manner and extended backwards over the wing top and attached to the wing in an air tight manner, said air tight member joins the cowling one to the other at their front parts in such a manner to prevent air from passing back between the cowlings and between the cowlings and the wing top; when the source of power drives the several sets of air propeller blades the air in the path of the air tight member and in the path of the cowlings is drawn through the cowlings by suction and then driven backwards by the air propeller blades, then the several slip-streams join together and form a blanket of fast moving air from the cowlings back over the wing top while at the same time right and left air tight fins prevent air from entering from the outside to go under the air blanket, thereby a low air pressure is in effect for lift under the air blanket and over the wing top.

19. Propulsion mechanism for aircraft having, a fuselage, a pair of wings on opposite sides of the fuselage, strut means between the pair of wings on each side of the fuselage and spaced from the fuselage, a source of power in the fuselage, two or more propeller units for each side of the fuselage, two or more cowlings attached rigidly together at their sides and surrounding said two or more propeller units, one cowling for each unit positioned at each side of the fuselage between the fuselage and strut means, each propeller unit driven by said source of power, said cowlings with propeller units are rotatably mounted on an axis passing transversely through said fuselage and means to rotatably adjust said cowlings and propeller units to different angular positions with respect to said fuselage.

20. Propulsion mechanism for conveyance having electric motor for power, a cowling, air propeller blades and air scoops, a shaft to transmit the power from the motor to the air propeller blades and air scoops, said motor placed above the conveyance top surface on a supporting leg, said cowling attached to the conveyance top surface surrounds said air propeller blades and air scoops and is placed in advance of the motor, said cowling consisting of leading and trailing portions with respect to the conveyance, the leading portion of the cowling wall shaped like a large funnel with its smaller part to the rear, the trailing portion of the cowling wall shaped like a large funnel in reverse with its smaller part to the front where a rigid connection is made with the leading portion, said air scoops secured to the outer ends of the said air propeller blades one air scoop to the front and one air scoop to the rear of each air propeller blade, the air scoop at the leading portion shaped with angle of attack to draw air away from the cowling and the air scoop at the trailing portion shaped with angle of attack to push air towards the cowling; when the motor is put into reverse the air flow through the cowling is reversed from its former flow and the air scoops reverse their action and the leading and trailing portions of the cowling are reversed as far as thrust is in effect thereby the conveyance is driven forward or backward depending on the direction of rotation of the drive shaft.

HERBERT ELLWOOD IRWIN.